(12) United States Patent
Leyn

(10) Patent No.: US 7,003,062 B1
(45) Date of Patent: Feb. 21, 2006

(54) METHOD AND SYSTEM FOR DISTRIBUTION OF CLOCK AND FRAME SYNCHRONIZATION INFORMATION

(75) Inventor: Alexander I. Leyn, Waterloo (CA)

(73) Assignee: Cisco Systems Canada Co., Halifax (CA)

( * ) Notice: Subject to any disclaimer, the term of this patent is extended or adjusted under 35 U.S.C. 154(b) by 751 days.

(21) Appl. No.: 09/784,221

(22) Filed: Feb. 14, 2001

(51) Int. Cl.
H04L 7/04 (2006.01)

(52) U.S. Cl. ................ 375/362; 375/354; 375/356
(58) Field of Classification Search ........... 375/362, 375/354, 356, 369–371, 375–376, 357; 348/512–514, 348/423.1; 370/509, 512, 516
See application file for complete search history.

(56) References Cited

U.S. PATENT DOCUMENTS

| | | | | |
|---|---|---|---|---|
| 5,726,989 A | * | 3/1998 | Dokic | 370/509 |
| 5,784,119 A | * | 7/1998 | Noda et al. | 348/512 |
| 6,151,375 A | * | 11/2000 | Nakatsugawa | 375/370 |
| 6,288,748 B1 | * | 9/2001 | Watanabe et al. | 348/511 |
| 6,665,310 B1 | * | 12/2003 | Nakatsugawa | 370/442 |

OTHER PUBLICATIONS

IEEE, "IEEE 100 The Authoritative Dictionary of IEEE Standard Terms", Seventh Edition, Published by Standards Information Nework IEEE Press, Dec. 2000, pp. 1140-1141.*

* cited by examiner

Primary Examiner—Phuong Phu
(74) Attorney, Agent, or Firm—Beyer Weaver & Thomas, LLP

(57) ABSTRACT

The present invention discloses a method and system for synchronizing processing modules. More specifically the present invention utilizes a master clock signal and associated synchronization information to coordinate the function dictated by packets within a synchronization stream. The master clock has multiple sources. Each module in the system is connected to each clock source to ensure that if one source fails, the module will not fail. The clock signal to each module is further passed through a locked oscillator, which will continue to maintain the clock signal should the master clock signal fail. Each module contains a sync decoder to decode the SYNC packets in the synchronization stream, into system time events. The system time events are then passed to a plurality of event receivers. Each event receiver contains at least one flywheeling counter to ensure that each event receiver remains in synchronization with the system time events being passed by the sync decoder. Flywheeling also permits receivers to remain synchronized in the absence of the synchronization stream for finite periods of time.

20 Claims, 5 Drawing Sheets

METHOD AND SYSTEM FOR DISTRIBUTION OF CLOCK AND FRAME SYNCHRONIZATION INFORMATION

FIELD OF THE INVENTION

The present invention relates generally to systems and methods for processing data. More specifically, the present invention relates of the synchronization of data by utilizing a master clock signal and associated synchronization information.

BACKGROUND OF THE INVENTION

Synchronization is the act of aligning events in time. Synchronization in communication systems, such as those that distribute digital video, is used for accurate transmission and reception of communication data, precise buffer management, and distortion-free signal switching.

Synchronization is a central issue for many communication systems and has many variations. A global communication system often requires synchronization between geographically dispersed sites. Each site often requires synchronization between individual equipment chassis within a site. Each chassis often requires synchronization between individual modules within the chassis. Each of these levels of a synchronization hierarchy, require different tradeoffs in terms of precision, flexibility, robustness, and cost.

Maintaining synchronization at any level is important to ensure the accuracy and timeliness of delivery of data in a communication system. For example, in the real time delivery of an MPEG-2 stream, the communication system should be able to withstand various perturbations to synchronizing information as well as the failure or removal of components within the system.

Traditional approaches to providing robust synchronization have not been able to ensure that synchronization is maintained during perturbations to the communication system. Traditional approaches require multiple clocks or global counters, thus adding to the complexity and cost of the communication system. Thus, there is a need for a flexible and low cost solution to the problem of robust synchronization. The present invention addresses this need.

SUMMARY OF THE INVENTION

The present invention is directed to a system for synchronizing data streams, the system having: an input source for a CLK and a SYNC stream, a SYNC decoder for receiving the CLK and SYNC streams and decoding the SYNC stream packets into a qualified system time events, a number of SYNC receivers, for receiving said qualified system time events and converting the qualified system time events to one or more derived time events, and output means for transmitting the derived time events.

The present invention is also directed to a method for synchronizing data streams having the steps of: receiving a CLK signal, receiving a SYNC stream, decoding the SYNC stream into a number of qualified system time events, the decoding utilizing the CLK signal, transmitting each of the qualified system time events to one or more receivers, creating and synchronizing derived time events contained in the qualified system time events packets within the receivers, and transmitting the derived time events.

The present invention is further directed to a method for synchronizing data streams, the method having the steps of: receiving a CLK stream and a SYNC stream, decoding the SYNC stream into qualified system time events, transmitting the qualified system time events to a number of SYNC receivers, converting of the qualified system time events by the SYNC receivers to one or more derived time events, and transmitting the derived time events to one or more components.

The present invention is further directed to a computer data signal embodied in a transmission medium having: a number of packets, each packet having: a high level logic bit, a packet start bit, a group of flag bits, a low bit, a group of checkword bits; and a take bit.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE PREFERRED EMBODIMENTS

Throughout this disclosure and the claims, we will refer to the terms master and slave. A master is the source of synchronizing time events, whereas the slave is the receiver of the synchronizing time events. A master may itself be a slave to another master higher in the synchronization hierarchy.

Synchronization events may have several levels of time resolution. Specifically of interest is fundamental clock synchronization, which is the highest resolution time event in a system. Based on clock synchronization, time events with periods longer than the fundamental clock often must be synchronized. In a typical system, several such longer period time events may co-exist and must often be efficiently synchronized. The term clock synchronization is used to refer to the synchronization to the fundamental clock in a system. The term frame synchronization is used to refer to the synchronization to the time events with periods longer than the fundamental clock.

Figure 1:
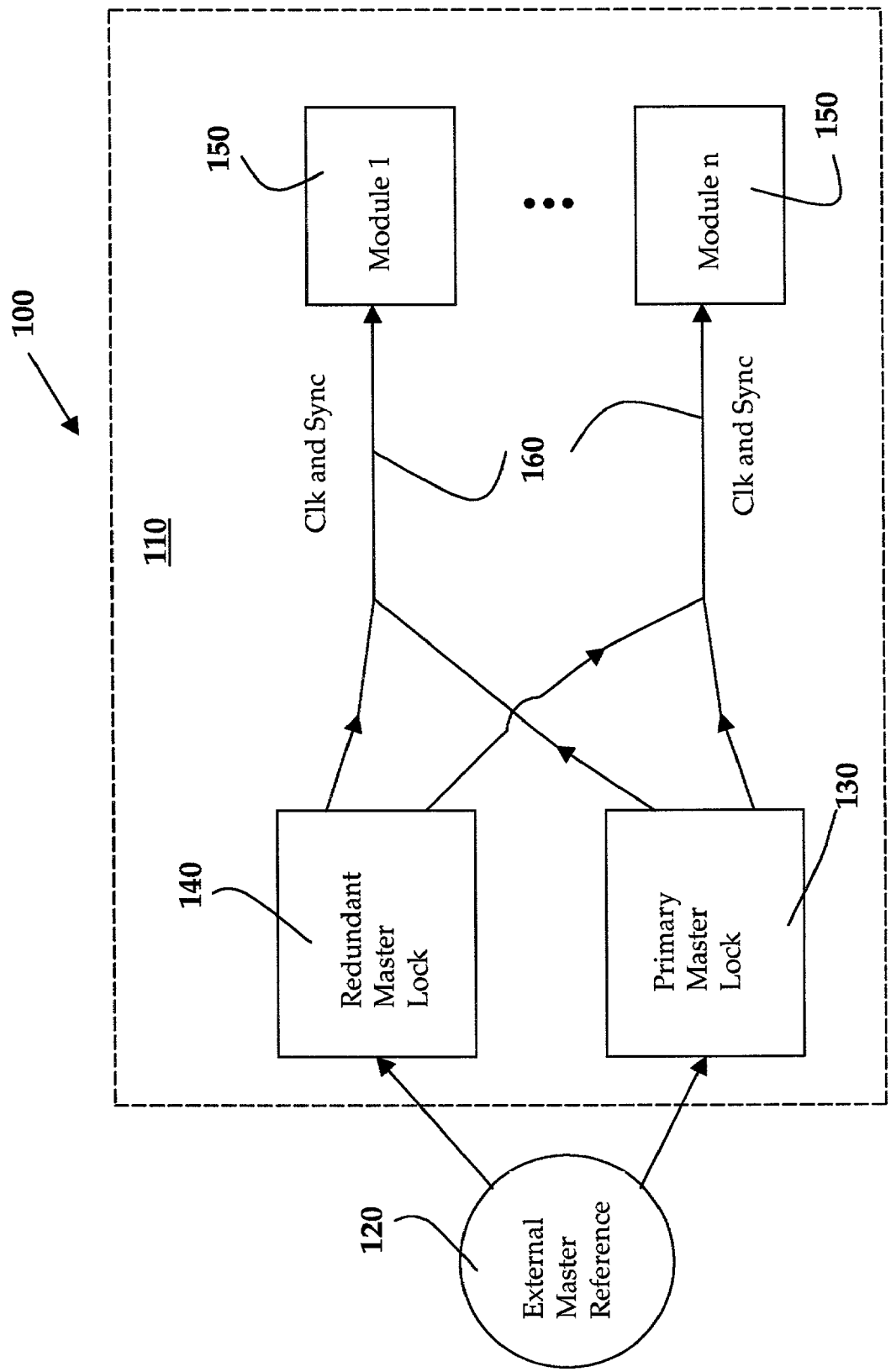
FIG. 1 is a block diagram of a system utilizing the present invention.

Referring now to FIG. 1, a block diagram of a system utilizing the present invention is shown generally as 100. System 100 comprises mutli-module chassis 110 and master reference 120. Master reference 120 is the source of all synchronizing time events for multi module chassis 110. Multi module chassis 110 comprises primary master lock, 130, redundant master lock 140 and a plurality of slave lock modules 150. Connections 160 carry CLK and SYNC signals from primary master lock 130 and redundant master lock 140 to each slave lock module 150. Primary master lock 130 and redundant master lock 140 each provide a CLK/SYNC signal pair for each slave lock module 150. These signals are combined so that each slave lock module 150 has a single input for all CLK/SYNC signal pairs.

The provision of an independent pair of CLK/SYNC signals to each module 150 ensures that the failure of a single module 150 will not interrupt the operation of other modules 150 in chassis 110. Further redundancy is provided through the use of redundant master lock 140. Should primary master lock 130 fail, redundant master lock 140 will continue to transmit CLK/SYNC signals to each module 150. The inventors and those skilled in the art will recognize that any number of redundant master clocks 140 may be provided to practice the present invention, including none.

As one skilled in the art will appreciate, master reference 120 is external to multi module chassis 110 and is not required to implement the present invention. Primary master lock 130 and redundant master lock 140 may provide timing information independently. However, in order to synchronize multiple module chassis' 110 master reference 120 is required.

Figure 2:
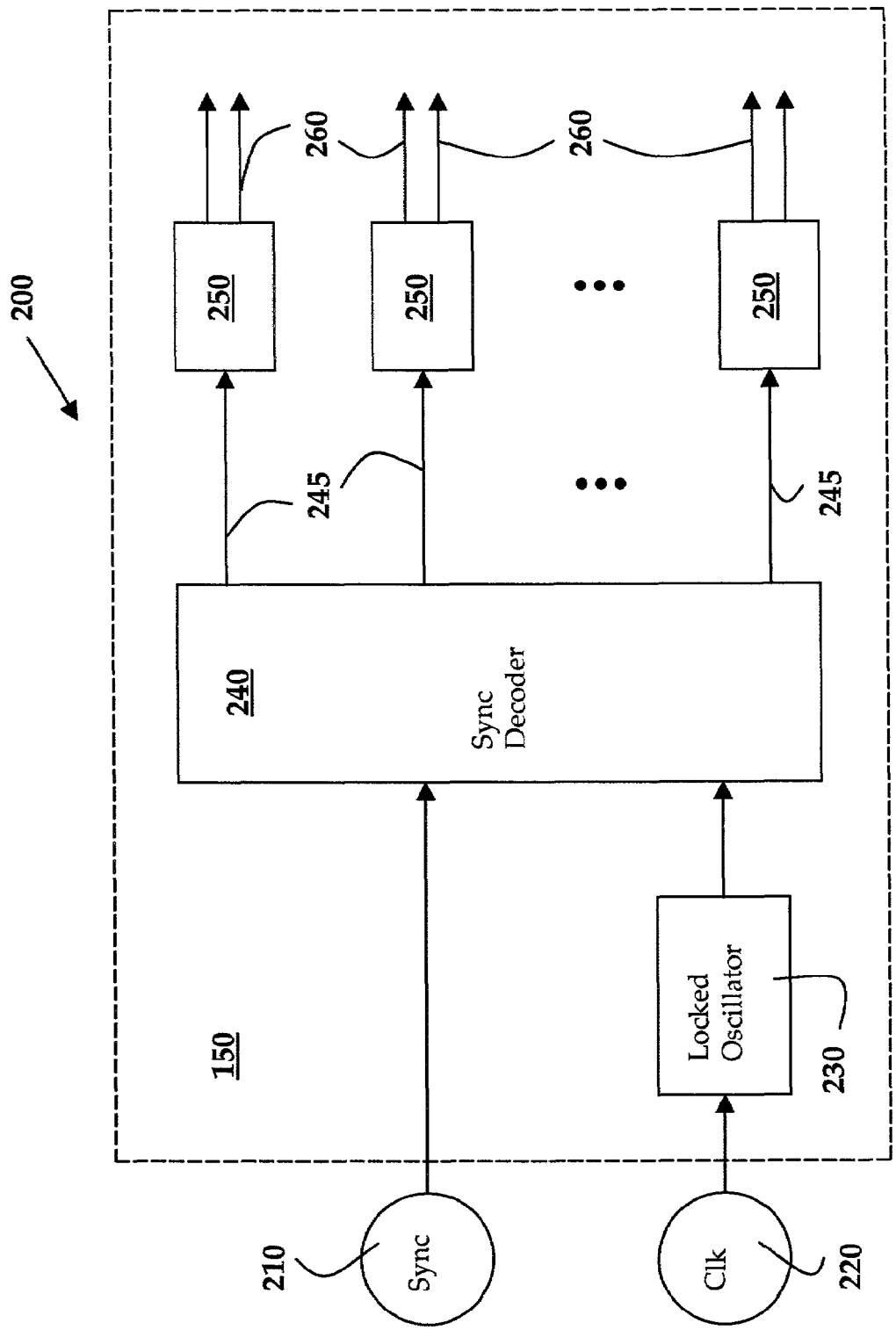
FIG. 2 is a block diagram of a slave lock module.

Referring now to FIG. 2 a block diagram of a slave lock module 150 is shown. Slave lock module 150 comprises locked oscillator 230, sync decoder 240, system events communication lines 245, SYNC receivers 250 and derived time events 260.

Slave lock module 150 receives as input, a SYNC signal 210 and a CLK signal 220, both of which are transported via connection 160. CLK signal 220 is passed to locked oscillator 230. In one embodiment locked oscillator 230 is a narrow band voltage controlled crystal oscillator PLL. The use of locked oscillator 230 allows for robust operation when the CLK signal 220 is temporarily removed, possibly due to the failure or removal of the source of CLK signal 220. In the embodiment shown in FIG. 1, this could occur when both primary master lock 130 and redundant master lock 140 are simultaneously disabled.

Sync decoder 240 takes as input SYNC signal 220 and the CLK signal as output from locked oscillator 230 and parses the packets contained in the SYNC signal 220. The parsing of the packets produces qualified system time events. A qualified system time event is an event that has been qualified to be correct by the use of the checkwords contained in the packet and that is positioned correctly to at the time instance of the take event. The individual qualified system time events present in the SYNC packets are passed along frame event communication lines 245 to SYNC receivers 250. Further detail on the structure of the SYNC packets is described below with reference to FIGS. 3, 4 and 5. A set of qualified time events received by SYNC receiver 250 is interpreted as to function and the interpreted functions are passed on as derived time events 260 to another component in system 100. The periodicity of derived time events may have either a simple (i.e. integer) or a complex relationship to qualified system time events.

Each sync receiver 250 contains a least one flywheel counter. Flywheeling refers to a feature that when a counter overflows, it is automatically reset (i.e. synchronized) to a known count. The derived time events 260 of each receiver 250 are dependent on the value of the counter, not on the event. Various frame events synchronized by sync stream 210 may have unrelated periods, for example periods of a relatively prime number of CLKs. The use of flywheeling counters in sync receivers 250 allows events that occasionally occur close to each other but cannot be triggered together with the required precision, to be resolved by simply suppressing a particular event until its next natural occurrence. Flywheeling also allows all sync receivers 250 to remain in sync even when some events are thus missing. Flywheeling also allows sync receivers 250 to remain in sync under conditions of a corrupted or missing SYNC signal.

Figure 3:
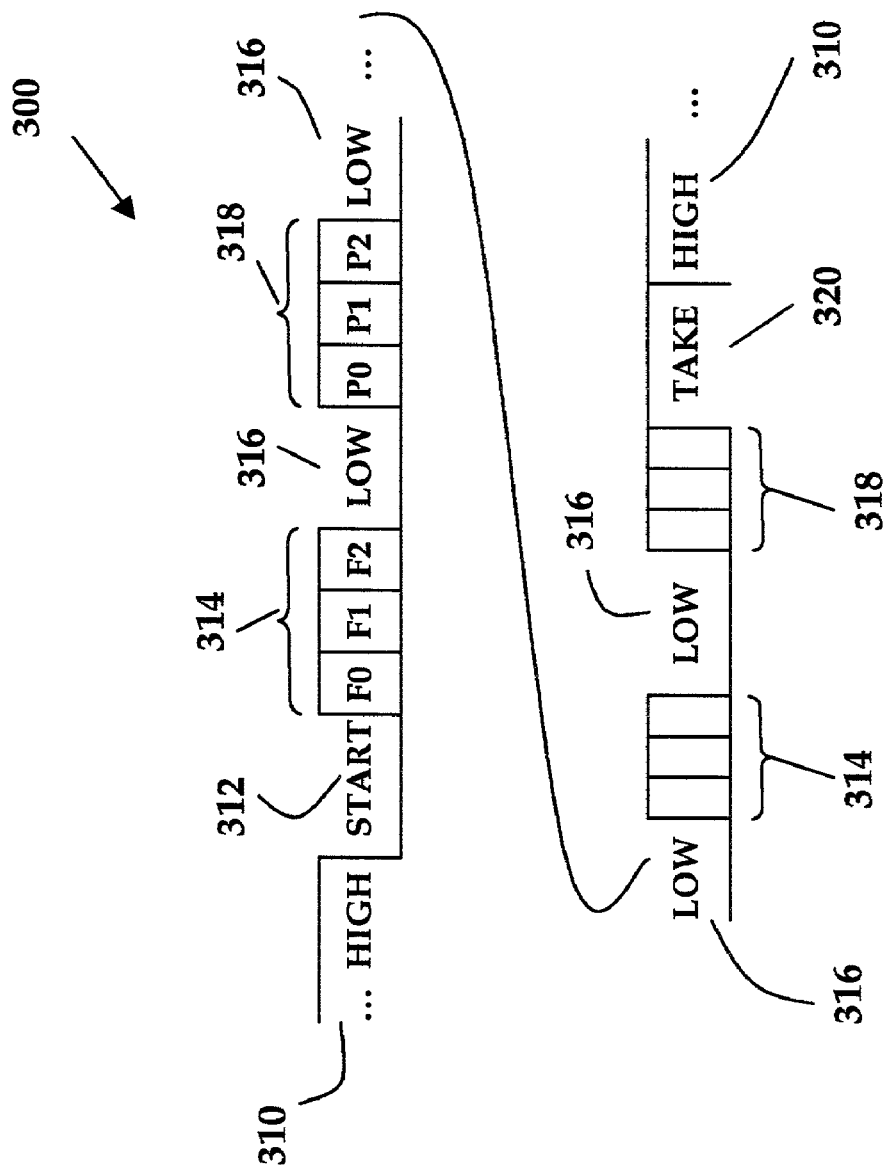
FIG. 3 is a schematic diagram of a generic SYNC packet.

Referring now to FIG. 3, a generic SYNC packet is shown generally as 300. SYNC packet 300 is a packet within SYNC signal 210. SYNC signal 210 contains a plurality of SYNC packets 300. Each SYNC packet 300 indicates various video, audio, system and other synchronization events. SYNC signal 210 carries only real time information. Packet 300 begins with a high logic level bit 310. At least three bits 310 are required between consecutive packets 300. Following bits 310 is packet start bit 312, which is at a low logic level. Following start bit 312, is a flag group 314 comprising three single bit flags. Each bit within flag group 314 has a high logic level to indicate an active system event and a low logic level to indicate that the system event represented by the flag is to be ignored. Following flag group 314 is low bit 316 indicating a low logic level. Following low bit 316 is checkword group 318. Checkword group 318 is a three bit CRC-3 checkword of the values in proceeding flag group 314. In the one embodiment the value of checkword group 318 is calculated using the CRC-3 polynomial as is well known in the art. In one embodiment the CRC-3 polynomial is $x^{**}3+x+1$, with an initial value of 111 (base 2). In one embodiment the least significant bit of the checkword group 318 value is transmitted first. In packet 300, multiple flag groups 314 and corresponding checkword groups 318 may occur. Packet 300 ends with take bit 320, which is a high logic level where all events indicated by flag groups 314 become active. Then the cycle repeats.

Although the embodiment described above utilizes a CRC-3 polynomial to calculate the checkword it is not the intent of the inventors restrict the present invention to the use of a CRC to generate a checkword. Any other method of generating a checkword is considered by the inventor to be within the spirit and scope of the present invention.

Low bits 316 ensure that a sequence of four high bits can never occur within packet 300. SYNC receivers 250 distinguish between low bits 316 (effectively an indication that packet 300 continues) and take bit 320 by observing every fourth bit after the detection of start bit 312.

If the value of one or more checkword groups 318 and the associated calculated CRC-3 value do not match, the entire packet 300 is ignored.

Since it is possible for the sequences leading up to start bit 312 and take bit 320 to occur in the middle of a SYNC signal 210, a sync receiver 250 may not properly decode the first packet 300 that it sees, for example if the receiver 250 is enabled in the middle of a packet 300. To avoid this potential problem, in one embodiment, a receiver 250 will revert to a search for four consecutive high bits 310 upon initialization, when a CRC error is detected, or at any other time when synchronization to the start of the SYNC packet is in doubt.

As can be seen from its design, SYNC packet 300 is extensible. It further supports both backward and forward format compatibility when the structure layout is followed.

By way of example, we shall now refer to specific instances of generic SYNC packet 300 utilized in an MPEG-2 environment.

Figure 4:
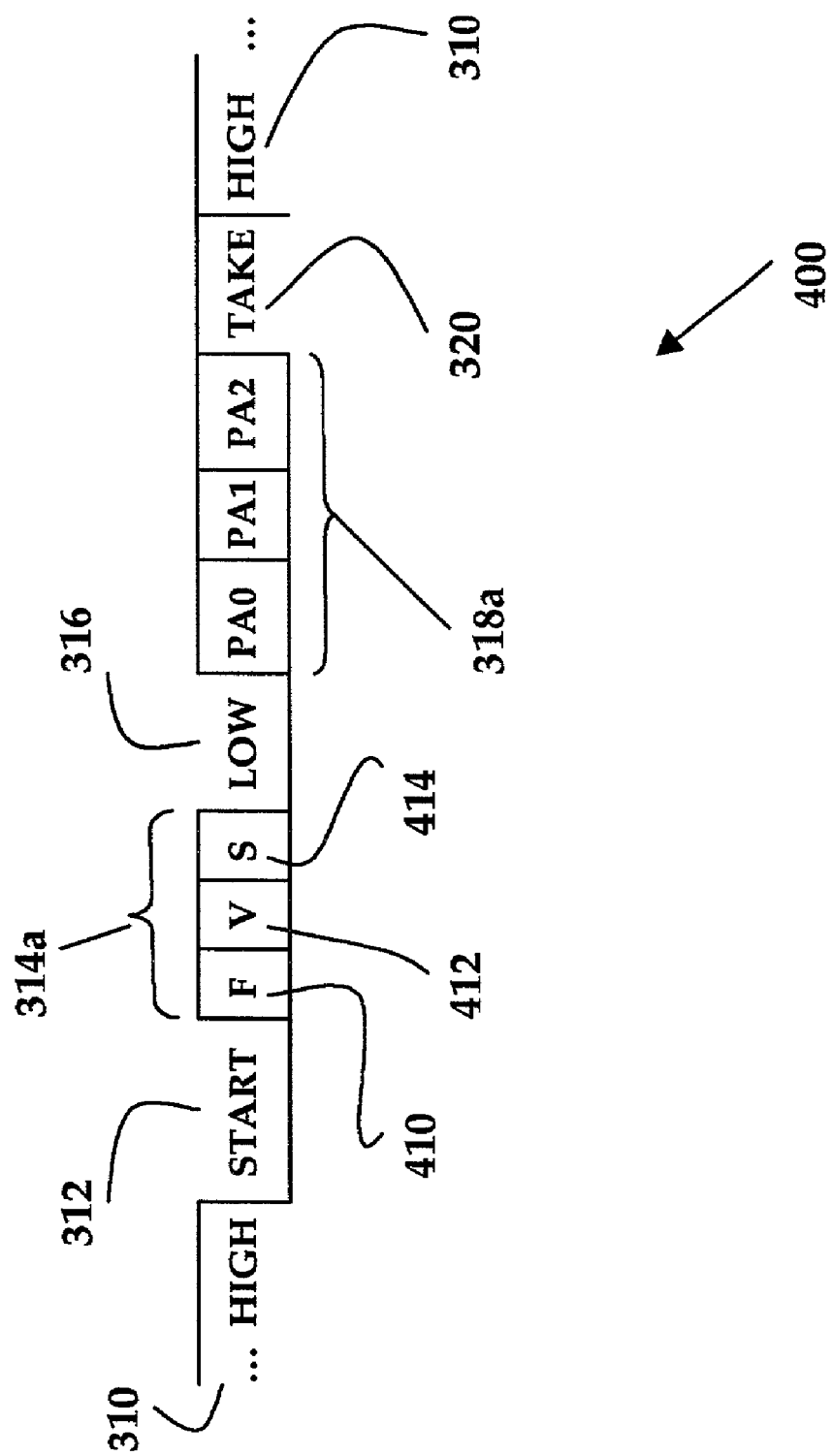
FIG. 4 is a schematic diagram of a first specific SYNC packet.

Referring now to FIG. 4 a first specific SYNC packet is shown generally as 400. As discussed above in regard to generic packet 300 of FIG. 3, high bit 310, start bit 312, low bit 316 and take bit 320 are identical in function. In packet 400, flag group 314a is a specific instance of flag group 314 of FIG. 3. Flag group 314a comprises three bits; namely F bit 410, V bit 412 and S bit 414. F bit 410 is a video frame synchronization bit. When F bit 410 contains the value one, a video frame synchronization event occurs when take bit 320 is accepted. When F bit 410 contains the value zero, no information is conveyed. V bit 412 is a video vertical sync bit, otherwise known as a field sync. When V bit 412 contains the value one, then a video vertical sync event occurs when take bit 320 is accepted. When V bit 412 contains the value zero, no information is conveyed. S bit 414 is a system timer reference (STR) reset. The STR (not shown) is a 24 bit counter incremented by CLK signal 220. When S bit 414 contains the value one, the STR will be set to the value of 0xFFFFF7 when take bit 320 is accepted. When S bit 414 contains the value zero, no information is conveyed. Checkword group 318a is an instance of checkword group 318 as shown in FIG. 3 and is three bit CRC-3 checkword of the values in proceeding flag group 314a.

Figure 5:
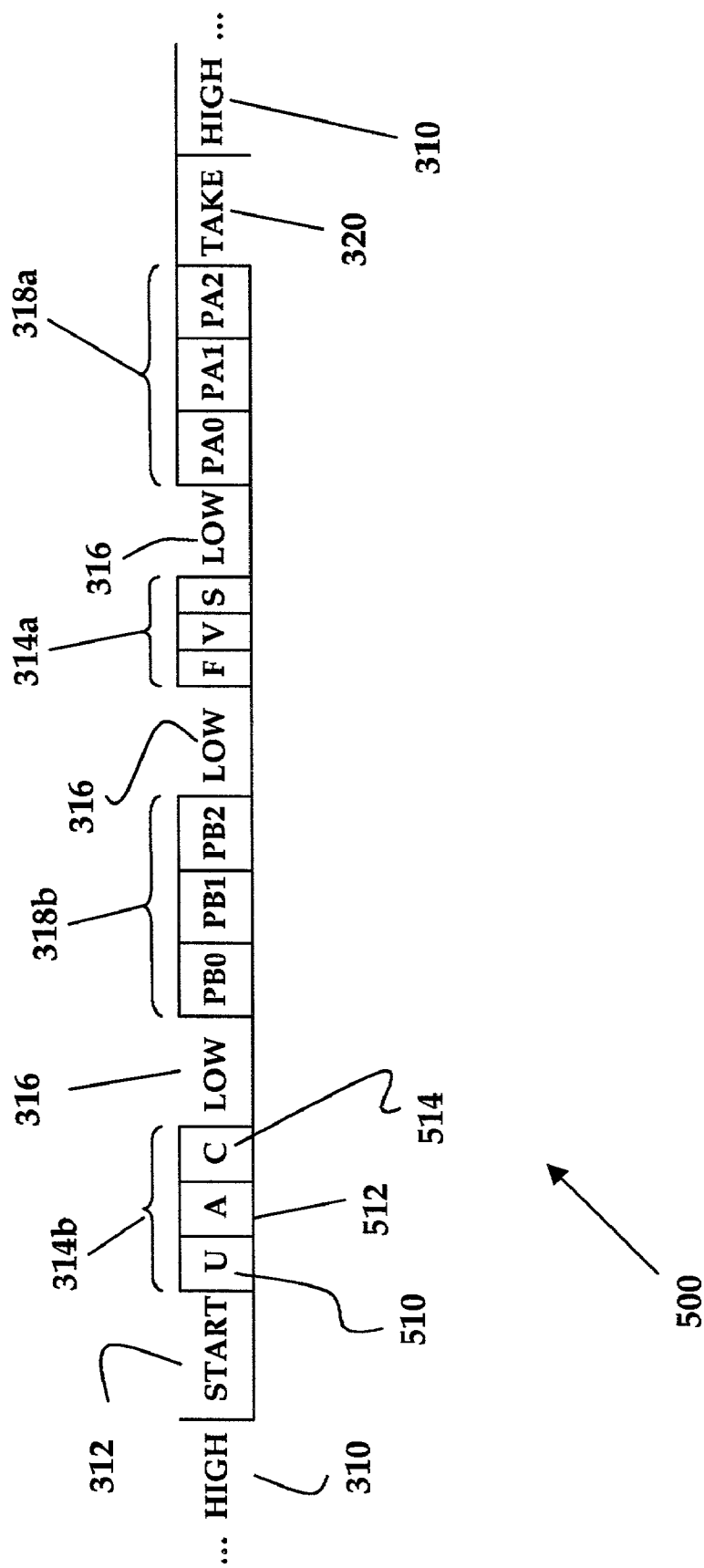
FIG. 5 is a schematic diagram of a second specific SYNC packet.

Referring to FIG. 5 a second specific SYNC packet is shown generally as 500. As previously discussed for generic packet 300 of FIG. 3, high bit 310, start bit 312, low bit 316 and take bit 320 provide the same functionality in packet 500 as they do in packet 300. Similarly flag group 314a and checkword group 318a are identical to those of first specific packet 400.

Packet 500 incorporates the content of packet 300 while adding additional data, namely flag group 314b and checkword group 318b. Note that in doing so, packet 500 conforms to the structure defined by generic packet 300 of FIG. 3.

In packet 500, first flag group 314b comprises three bits; namely U bit 510, A bit 512 and C bit 514. U bit 510 is undefined and is set to zero.

A bit 512 is an audio sync bit. When A bit 512 is set to one an audio sync event occurs when take bit 320 is accepted. When A bit 512 is set to zero, no information is conveyed. In a 59.94 fields/sec video system, an audio sync event is a five video frame reset that indicates that exactly 8008 samples of 48 KHz audio have occurred. It may also be used to derive the 100 frame and 15 frame resets required for 44.1 KHz and 32 KHz audio respectively. The Society of Motion Picture and Television Engineers standard SMPTE 272M-1994 provides a detailed explanation of an audio sync event. In 50 fields/sec video systems an audio sync event coincides with F bit 410, i.e a video frame sync event. For 60 fields/sec video systems, an audio sync event is a three frame reset that indicates that exactly 3200 samples of 32 KHz audio have occurred. Note that 48 KHz and 44.1 KHz audio has an integer number of samples in every sixty fields/sec video field.

C bit 514 is a video color frame sync bit. When C bit 514 has the value one, then a video color frame sync event occurs when take bit 320 is accepted. When C bit 514 contains the value zero, no information is conveyed. For composite video references, C bit 514 indicates the time location of color field one (refer to SMPTE 170M-1994 for NTSC information and equivalent PAL standards). For component video references, C bit 514 will always equal V bit 412.

S bit 414 is not coincident with the video vertical sync event indicated by V bit 412 (i.e. the periods of S and V events are relatively prime numbers). On the other hand, all other flags (F bit 410, C bit 514 and A bit 512) are coincident with V bit 412 (but not necessarily vice versa). This implies that the period of S bit 414 will float through the period of V bit 412. To allow these relatively prime signals to be encoded in the same SYNC packet format and the fact that all SYNC receivers 250 flywheel, requires that the following rules be followed:

a) S bit 414 cannot be active at the same time as V bit 412;
b) When an STR reset (S bit 414) and a video vertical sync event (V bit 412) overlap in time, then the STR event takes precedence. Thus, during such an overlap all bits save for S bit 414 are suppressed (i.e. set to zero value). Since STR resets are fairly rare, V bit 412 and other related bits will never be suppressed for two or more consecutive SYNC packets.

Although this disclosure refers to the use of flags in a SYNC stream adapted for MPEG-2 use, it is the intent of the inventors that the present invention may be used for synchronizing any data stream that may make use of a CLK/SYNC combination.

In another embodiment, the invention may be practiced without the use of flywheeling counters in sync receivers 250. Such a design choice may be made as a trade off between the and the cost of having the counters.

The methods of the present invention may be implemented on various systems. For example, the invention may be implemented on network devices such as routers, headends and/or switches. In a specific embodiment, the systems of this invention may be video manipulation devices such as, for example, specially configured headend models VN5000 and VN2000 available from Cisco Systems Network Canada Corporation of Waterloo, Ontario Canada. These devices are multi-module chassis based systems.

Although the invention has been described with reference to certain specific embodiments, various modifications thereof will be apparent to those skilled in the art without departing from the spirit and scope of the invention as outlined in the claims appended hereto.

I claim:

1. A system for synchronizing data streams, the system comprising:
   a) an input source for a CLK and a SYNC stream;
   b) a SYNC decoder for receiving said CLK and SYNC streams and decoding SYNC stream packets from said SYNC stream into qualified system time events, where each qualified system time event has been temporally qualified by the SYNC decoder using a checkword contained in a SYNC stream packet;
   c) a plurality of SYNC receivers, for receiving said qualified system time events and converting said qualified system time events to one or more derived time events; and
   d) an output interface for transmitting said derived time events.

2. The system of claim 1 wherein said input source comprises one or more master locks.

3. The system of claim 1 wherein said input source comprises a locked oscillator that outputs said CLK stream to said SYNC decoder, wherein the locked oscillator maintains a CLK stream even when a source of a CLK stream is removed.

4. The system of claim 1 wherein said input source receives said CLK stream from an external master reference and outputs said CLK stream to said SYNC decoder.

5. The system of claim 1 wherein each of said SYNC receivers comprises a flywheeling counter, wherein the derived time events are dependent on the value of each flywheeling counter.

6. The system of claim 1 wherein said SYNC stream comprises a plurality of packets, each packet comprising: a high level logic bit, a packet start bit, a group of flag bits, a low bit, a group of checkword bits; and a take bit.

7. The system of claim 6, wherein the flag bits, low bit and checkword bits repeat within each packet.

8. A method for synchronizing data streams comprising the steps of:
   a) receiving a CLK signal;
   b) receiving a SYNC stream;
   c) decoding said SYNC stream into a plurality of qualified system time events, where each qualified system time event has been temporally qualified by a SYNC decoder using a checkword contained in a SYNC stream packet, said decoding utilizing said CLK signal;

d) transmitting each of said plurality of qualified system time events to one or more receivers;

e) creating and synchronizing derived time events using said qualified system time events within said receivers; and f) transmitting said derived time events.

9. A method for synchronizing data streams, said method comprising:

a) receiving a CLK stream and a SYNC stream;

b) decoding said SYNC stream into qualified system time events, where each qualified system time event has been temporally qualified by a SYNC decoder using a checkword contained in a SYNC stream packet;

c) transmitting said qualified system time events to a plurality of SYNC receivers, d) converting of said qualified system time events by said SYNC receivers to one or more derived time events; and e) transmitting said derived time events to one or more components.

10. The method of claim 9 wherein said CLK stream is received from one or more master locks.

11. The method of claim 10 wherein said one or more master locks receive said CLK stream from an external master reference.

12. The method of claim 9 wherein said CLK stream is received from a locked oscillator.

13. The method of claim 9 wherein said converting of said SYNC packets utilizes at least one flywheeling counter.

14. A system for synchronizing data streams, comprising:
means for receiving a CLK signal;
means for receiving a SYNC stream;
means for decoding said SYNC stream into a plurality of qualified system time events, where each qualified system time event has been temporally qualified the means for decoding using a checkword contained in a SYNC stream packet, said decoding utilizing said CLK signal;
means for transmitting each of said plurality of qualified system time events to one or more receivers;
means for creating and synchronizing derived time events using said qualified system time events within said receivers; and
means for transmitting said derived time events.

15. A system for synchronizing data streams, the system comprising:

a) an input source for a clock and a synchronization stream;

b) a synchronization decoder for receiving said clock and synchronization streams and decoding synchronization stream packets in said synchronization streams into qualified system time events, where each qualified system time event has been temporally qualified by the synchronization decoder using a checkword contained in a synchronization stream packet;

c) a plurality of synchronization receivers, for receiving said qualified system time events and converting said qualified system time events to one or more derived time events; and d) an output interface for transmitting said derived time events.

16. The system of claim 15 wherein a periodicity of the derived time events has a an integer or a complex relationship to the qualified system time events.

17. The system of claim 15 wherein the derived time events of each synchronization receiver are dependent on a value of a counter included in the receiver.

18. The system of claim 15 wherein said input source comprises one or more master locks.

19. The system of claim 15 wherein said input source comprises a locked oscillator that outputs said CLK stream to said SYNC decoder, wherein the locked oscillator maintains a CLK stream even when a source of a CLK stream is removed.

20. The system of claim 15 wherein each of said SYNC receivers comprises a flywheeling counter, wherein the derived time events are dependent on the value of each flywheeling counter.

* * * * *